W. KEENAN.
Felting-Machine.

No. 223,358. Patented Jan. 6, 1880.

Witnesses
John Becker
Fred. Haynes

Inventor
William Keenan

UNITED STATES PATENT OFFICE.

WILLIAM KEENAN, OF BROOKLYN, NEW YORK, ASSIGNOR OF ONE-HALF OF HIS RIGHT TO NICHOLAS B. HOOPER, OF SAME PLACE.

FELTING-MACHINE.

SPECIFICATION forming part of Letters Patent No. 223,358, dated January 6, 1880.

Application filed July 11, 1879.

*To all whom it may concern:*

Be it known that I, WILLIAM KEENAN, of Brooklyn, in Kings county and State of New York, have invented certain new and useful Improvements in Felting-Machines, of which the following is a specification.

My improvements especially relate to machines for felting, "sizing," or "planking" hat-bodies in which the hat-bodies, in the form of rolls, are placed between horizontally-arranged rubbers, which have a reciprocatory motion imparted to them in reverse directions, one of which is adjustable vertically, and the other of which is preferably provided with a felting-apron having a continuous motion in one direction, whereby the hat-bodies are fed through the machine.

My invention consists in a novel means whereby the pressure exerted by the said rubbers upon the hat-bodies as they pass between them may be increased or diminished to suit the character of goods to be felted.

Figure 1:
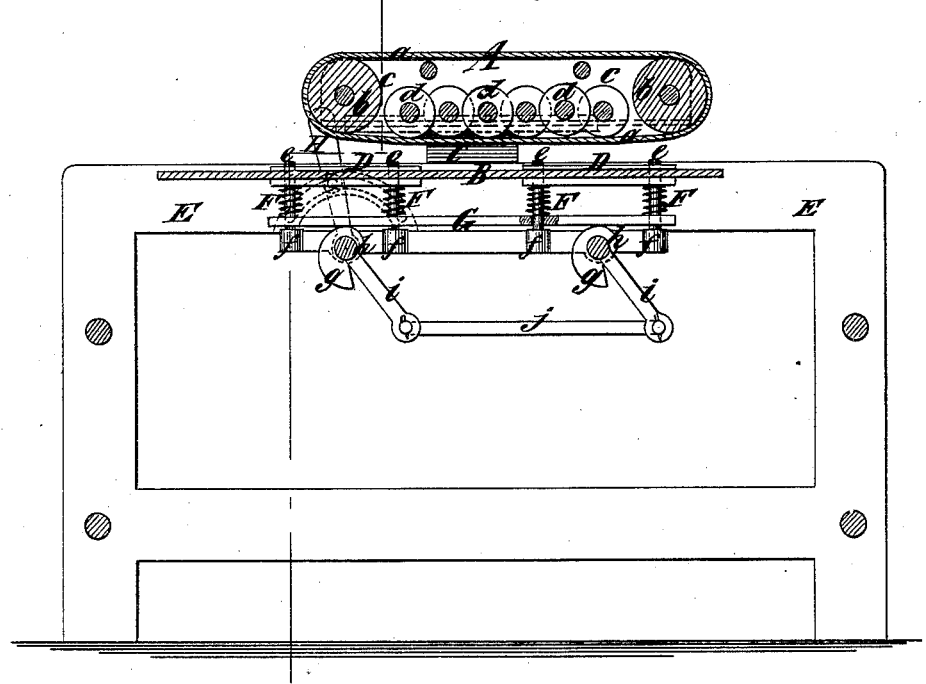
Figure 2:
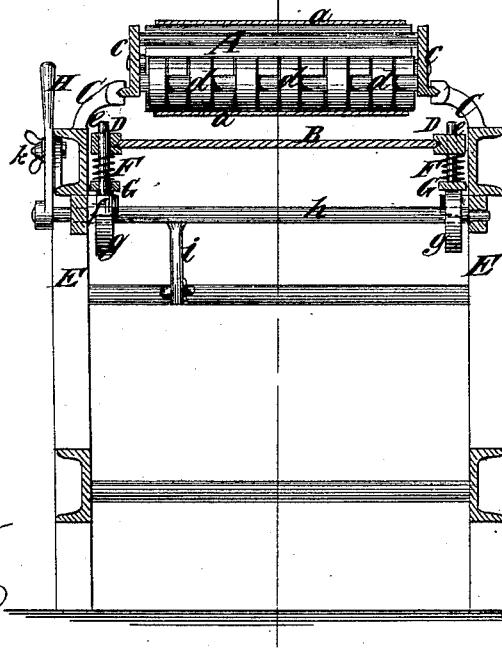

In the accompanying drawings, Figure 1 represents a longitudinal section of a machine embodying my improvements; and Fig. 2, a transverse section thereof on the dotted line $x\ x$, Fig. 1.

Similar letters of reference designate corresponding parts in both figures.

A B designate two horizontally-arranged rubbers, between which the hats or other articles to be felted are placed in the form of rolls. The rubber A is here shown as comprising an endless apron, $a$, to which a regular progressive motion is imparted. The said apron is represented as carried by rollers $b$, mounted in a frame-work, $c$; and for the purpose of making an unyielding rubbing-surface I employ a series of rollers, $d$, also supported in the frame-work $c$.

C designates guides or slideways, in which the rubber A is supported in such manner as to admit of its being reciprocated by any suitable mechanism. (Not here represented.)

The rubber B is also supported in guides or slideways D, in which it may be reciprocated by any suitable mechanism. To admit of the yielding of the rubber B under undue pressure the said guides are vertically adjustable, and are here represented as held upon pins $e$, extending from lugs $f$, projecting from the frame-work E of the machine. In order to support the guides D and admit of their yielding under heavy pressure, I employ springs F. (Here represented as of spiral form and coiled around the pins $e$.)

In order to suit different kinds of articles desired to be felted, I provide means for increasing or diminishing the pressure exerted by the rubber B at the will of the operator. When this rubber is supported on springs, as here represented, this object may be effected by increasing or diminishing the resistance offered by the springs to the lowering of the said rubber.

G designates bars, which are supported by the pins $e$ in such manner as to admit of their vertical movement upon said pins, and upon which the springs F rest. Cams $g$ may be employed to effect the adjustment of the bars G. They are shown as fixed upon shafts $h$, mounted in bearings in the frame-work of the machine, and as four in number, one placed near each corner of the rubber.

In order to effect the simultaneous adjustment of all the cams I have connected their shafts by levers $i$ and a link, $j$.

H designates a lever secured to one of the shafts $h$, and serving as a means for adjusting the cams. A clamp-screw, $k$, may be employed to hold said lever in any desired position.

It will be seen that by my invention I provide for greatly varying the pressure exerted by the rubber, and that the means employed effect the adjustment of the pressure exerted by the rubber at different points simultaneously in a horizontal plane, keeping it at all times parallel with the other rubber.

What I claim as my invention, and desire to secure by Letters Patent, is—

1. In a felting-machine, the combination, with two reciprocating rubbers adapted to receive between them the articles to be felted, one of said rubbers being vertically adjustable, of means for increasing or diminishing the pressure exerted by the vertically-adjustable rubber, substantially as specified.

2. In a felting-machine, the combination, with two reciprocating rubbers adapted to receive between them the articles to be felted, one of said rubbers being vertically adjustable, of springs acting upon said adjustable rubbers and means for increasing or diminishing the resistance of said springs, substantially as specified.

3. In a felting-machine, the combination, with two reciprocating rubbers adapted to receive between them the articles to be felted, one of said rubbers being vertically adjustable, of springs acting upon said adjustable rubber and a cam or cams for increasing or diminishing the resistance of said springs, substantially as specified.

4. In a felting-machine, the combination, with a reciprocating rubber capable of vertical adjustment, of springs acting upon the same, cams for increasing or diminishing the resistance of said springs, levers extending from the shafts of said cams, a link connecting said levers, and a lever whereby the cams may be simultaneously actuated, substantially as specified.

5. The combination, with the rubber B, of the guides D, springs F, shafts $h$, cams $g$, levers $i$, link $j$, and lever H, substantially as specified.

WILLIAM KEENAN.

Witnesses:
FREDK. HAYNES,
E. P. JESSUP.